March 6, 1928. 1,661,374
J. S. LACEY
DEVICE FOR EXPRESSING JUICES FROM FRUITS
Filed Aug. 26, 1926 2 Sheets-Sheet 1

Inventor
John S. Lacey.
By Lacey & Lacey, Attorneys

March 6, 1928. 1,661,374
J. S. LACEY
DEVICE FOR EXPRESSING JUICES FROM FRUITS
Filed Aug. 26, 1926 2 Sheets-Sheet 2
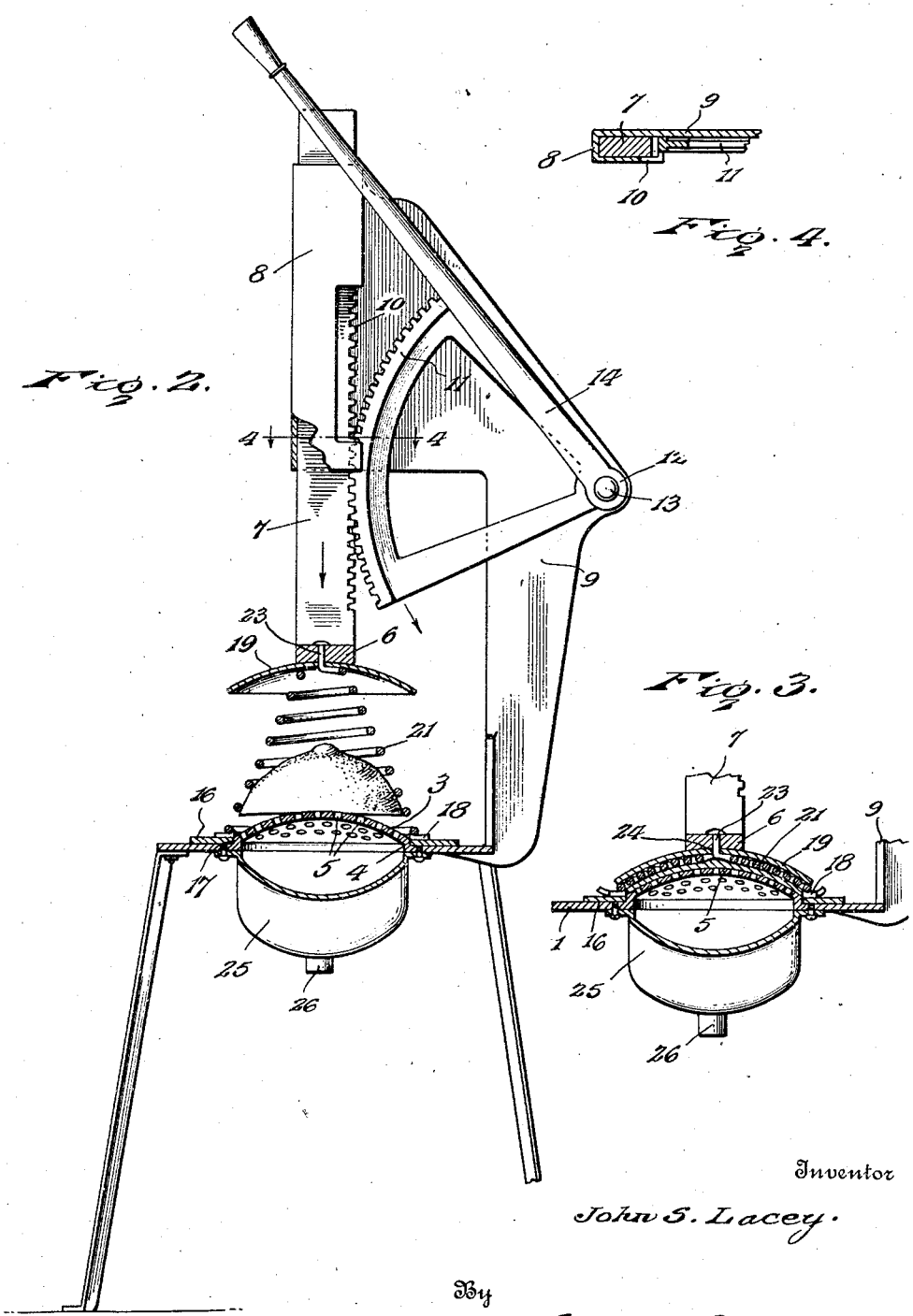
Inventor
John S. Lacey.
By Lacey & Lacey, Attorneys Patented Mar. 6, 1928.

1,661,374

UNITED STATES PATENT OFFICE.

JOHN S. LACEY, OF COLUMBUS, OHIO.

DEVICE FOR EXPRESSING JUICES FROM FRUITS.

Application filed August 26, 1926. Serial No. 131,721.

This invention relates to improvements in devices for extracting juice from citrous fruits. Various devices have been designed for this purpose such for example, those of the type embodying a pair of connected lever members and coacting substantially semi-spherical squeezing members between which the half of a lemon, orange, or other citrous fruit is disposed, and also devices of the type comprising a conoidal head having a ribbed or otherwise roughened surface over which the half of a lemon or the like is rotated and depressed, but such devices have been found to be inefficient for the reason that a very considerable quantity of the juice is left remaining although considerable effort may be employed in the use of such devices. Therefore, the present invention has as its primary object to provide a squeezing device for extracting the juice from citrous fruits which device will be so constructed as to effect a complete extraction of the juice so that the only waste is the skin or rind of the fruit and the exhausted pulp, all of the juice contained in the fruit being extracted therefrom.

Another object of the invention is to provide a device for the purpose stated in which the squeezing member will be so constructed and operated or adjusted in such a manner as to insure of great pressure being exerted uniformly over successive portions of the halved fruit to insure of complete expulsion of the juice from the pulp.

Another disadvantage presented by ordinary lemon squeezers is that while they may act with a fair degree of efficiency on a portion of a halved lemon or other citrous fruit, they will not act to extract the juice from all portions of the pulp and, therefore, the present invention has as a further object to provide a device for this purpose so constructed and operating in such a manner as to insure of a complete forceful compression of all portions of the pulp so that there will be a complete expulsion of the juice therefrom.

A further object of the invention is to provide a device for the purpose stated which may be operated more rapidly with better and quicker results than such devices as ordinarily constructed.

In the accompanying drawings:

Figure 2 is a vertical front to rear sectional view therethrough, the compressing or squeezing unit of the device being shown in elevated position and a half of a lemon being shown arranged within the device.

Figure 3 is a view similar to Figure 1, but illustrating the manner in which the said compressng or squeezng unit acts upon the halved fruit to express the juice therefrom.

Figure 4 is a detail horizontal sectional view taken substantially on the line 4—4 of Figure 2, looking in the direction indicated by the arrows.

Figure 1:
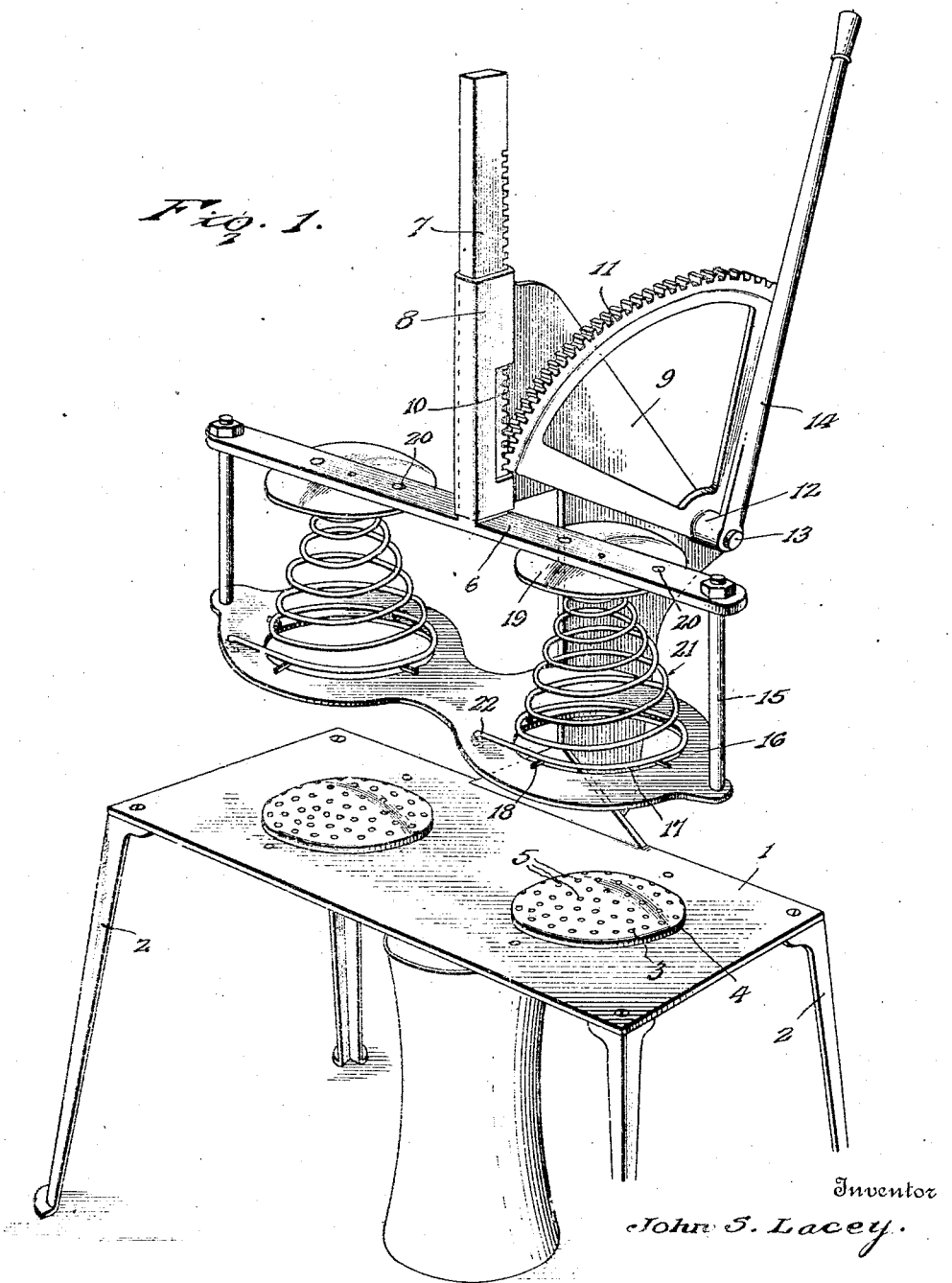
Figure 1 is a perspective view of the device embodying the invention.

The drawings illustrate one embodiment of the invention but the principles of the invention may find embodiment in structures other than that shown, as the invention resides chiefly in the manner in which the compression unit is formed and functions. In the drawings, the numeral 1 indicates a bed plate which is preferably supported by legs 2 or in any other suitable manner in elevated position and which is preferably of metal, either highly polished or enameled so as not to be corroded by any of the fruit juices which might reach the surface thereof, although the construction of the device is such that there is no likelihood of the fruit juices being expelled in an outward direction about the rim of the rind of the halved fruit. The invention contemplates the simultaneous expression of juice from the two halves of a lemon, orange, or other citrous fruit, and, therefore, the bed plate 1 is provided with a pair of supporting portions 3 for the halves fruit. The portions 3 are either pressed up from the bed plate 1 or molded integral therewith or formed in any other desired manner, and each of these portions is of concavo-convex form, as best shown in Figures 2 and 3 of the drawings, and is so formed that its convex side will be presented upwardly and elevated with respect to the plane of the upper side of the said bed plate. Likewise, in forming the said portions, each is provided with a peripheral vertically disposed shoulder 4 for a purpose to be presently explained. A number of perforations 5 are formed in each of the portions 3 for the passage of the expressed juices therethrough and it is preferable that the upper surfaces of the said portions be very smoothly surfaced or finished so that there will be minimum friction therebetween and the halved fruit disposed thereon during the expressing operation, and the purpose of providing for minimum friction between the fruit and the surfaces of the portions 3 will presently be more fully pointed out. By reference to Figure 2 of the drawings, it will be observed that the portions 3 are relatively shallow and that the halved fruit is disposed thereon with the pulp side resting upon the central portion of the respective portion 3.

In the illustrated embodiment of the invention, the compressing unit comprises a cross head 6 which is provided at its upper side intermediate its ends with an upstanding rack bar 7 which is vertically slidable in a rectangular guide sleeve 8 formed at the upper end of an upright bracket plate 9 preferably integrally joined at its lower end to the bed plate 1 at the rear side thereof, the sleeve 8 being open at its rear side, as at 10, so that a segmental gear 11 may coact with the rack 7, this gear having a hub 12 which is rotatably mounted upon a stub shaft 13 projecting laterally from one side of the bracket plate 9, a hand lever 14 being preferably formed integrally with the hub 12 and constituting means whereby the said segmental gear may be oscillated so as to effect up and down reciprocatory movement of the rack bar 7 and a vertical up and down movement of the cross head 6. The cross head 6 extends transversely above the centers of the supporting portions and rods 15 are slidably mounted at their upper ends through openings in the ends of the cross head and at their lower ends are anchored to the ends of a plate 16 which is, in this manner, supported beneath the cross head and in spaced relation thereto, when the cross head is in elevated position. The plate 16 is formed with spaced circular openings 17, each located above one of the supporting portions of the bed plate 1 and each of a diameter corresponding to the diameter of the said respective portion 3, so that when the plate 16 is lowered, the walls of the openings 17 will snugly surround the shoulders 4 of the said fruit supporting portions 3, as clearly shown in Figures 2 and 3 of the drawings. For a purpose to be presently explained, the plate 16 is provided upon its upper side, at suitable intervals about each of the openings 17, with relatively short upstanding relatively narrow ribs 18 which extend radially with respect to the respective opening, and which are sufficiently narrow to adapt them to serve as cutters or slitters in the operation of the device, as will be presently pointed out. A circular disc-like head 19 is riveted or otherwise anchored as at 20, to the under side of the cross head 6 above each of the openings 17 and these discs are preferably of slightly greater diameter than the said openings, as shown in Figures 2 and 3.

Each of the compressing members of the device, indicated in general by the numeral 21, is formed from a single length of wire coiled to spiral form, the major or base coil having its end anchored, as at 22, to the plate 16 and this coil resting upon the ribs 18 and being substantially concentric to and of approximately the same diameter as the respective opening 17 in the plate 16. The upper end of the spirally coiled wire is anchored, as at 23, in the cross head 6, extending through an opening 24 formed centrally in the respective disc 19. Preferably, the wire will be resilient although it is not absolutely essential that it possess this property. In any event, the coils will be so formed as to be progressively of gradually diminishing diameter from the base of the compression member to the apex thereof and this proportioning of the coils, as will be observed by reference to Figures 2 and 3 of the drawings, is such that when the cross head 6 is completely lowered through the operation of the hand lever 14, the coils will fit one within another, assuming this position as the cross head is lowered. Preferably, the discs 19 are of concavo-convex form and have their concave sides presented downwardly, and it is likewise preferable that these discs be of a diameter slightly greater than the diameter of the base or largest coil of the respective member 21, so that when the cross-head is completely lowered, as shown in Figure 3, the discs will bear against the compressed coils of the respective members 21 and in this manner a final maximum pressure may be exerted upon the halved fruit which is interposed between the members 21 and the supporting portions 3 of the base plate 1.

By reference now to Figures 1 and 2 of the drawings, it will be observed that when the lever 14 is swung rearwardly to the position shown in Figure 1, the cross head 6 will be elevated and the plate 16 will be likewise elevated so that the two halves of a halved lemon, orange, or other citrous fruit, may be disposed each upon an individual one of the supporting portions 3, as shown in Figure 2, whereupon the lever 14 is swung forwardly, thus lowering the cross head 6 and plate 16 and bringing the lower coils of the members 21 first into engagement with the halved fruit near the outer circumference thereof. As the lever is continued to be pulled forwardly, the cross head 6 will continue to be lowered, thus compressing members 21, the plate 16 having in the meantime assumed a position resting flat upon the upper surface of the bed plate 1 and with the walls of the openings 17 therein snugly encompassing the shoulders 4 of the supporting strainer portions 3. As the members 21 are compressed, the coils thereof will be successively brought into compressing engagement with the outer surfaces of the rinds of the halved fruit and the halves will be gradually flattened and their outer portions depressed so as to conform to the upper surfaces of the respective supporting portions 3. The coils, as the members 21 are compressed, will engage one within another and successively engage and exert compressive force upon the rinds of the halved fruit, thus gradually flattening the fruit until finally all of the coils are in compressing contact with the rinds and finally the discs 19 bear firmly against the upper sides of the interfitting coils of the two compressing members 21, as shown in Figure 3. As this operation progresses, the halved fruit will, of course, be flattened out and all of the juice will be expressed from the pulp, the juice being delivered through the perforations 5 in the supporting strainer members 3. It will be evident that inasmuch as the members 21 are finally caused to have their coils positioned so that the members will conform to the upper surfaces of the respective supporting portions 3, and the discs 19 finally exert pressure evenly over all of the coils, all of the pulp will be evenly subjected to the great pressure which can be obtained by operation of the hand lever 14 and, therefore, all of the juice will be expressed from the pulp. As the halved fruit is compressed, each half will, of course, spread and the rind at the outer circumference of the fruit will spread outwardly and coming in contact with the ribs 18, will be slit by these ribs or cut radially and, in this manner, the resistance which might otherwise be offered to outward creeping or expansion of the rinds is prevented and as the pulp nearest the outer circumference of the rinds is first acted upon to have its juice extracted, it is quite evident that the juice will not be expelled in an outward direction but will be forced directly through the perforations 5 in the supporting portions 3. As previously stated, the upper surfaces of the portions 3 are highly finished so that they will be exceptionally smooth and, therefore, but little frictional resistance offered to a flattening out and spreading of the halved fruit as the halves are compressed.

As a matter of convenience in collecting the expressed juice, a trough 25 is mounted beneath the base plate 1 and has its end portions at its open upper side encompassing the under sides of the portions 3 of the base plate or, in other words, the openings which are formed by pressing up or otherwise forming these portions, and the juices delivered into the trough are permitted to flow down the oppositely inclined bottom portions thereof and be delivered through a spout 26 provided at the lowermost point of the said bottom, the bottom being inclined downwardly from all sides. Therefore, a glass may be disposed beneath the spout, as shown in Figure 1 of the drawings, to collect the juice expressed from the two halves of the fruit.

Having thus described the invention, what I claim is:

1. In a device for expressing the juice from citrous fruits, a perforated support for a halved fruit, a supporting member movable toward and away from the fruit support and including an upper element, a lower element suspended therefrom and movable relative thereto and constructed to encompass the perforated support, and a compressing member movable with the supporting member and comprising a spiral disposed between and attached to the upper and lower elements of said member and having its coils of successively decreasing diameter whereby to successively engage and exert pressure against the exterior of the halved fruit from the outer to the central portion thereof upon movement of the supporting member toward the fruit support and consequent compression of the said compressing member.

2. In a device for expressing the juice from citrous fruits, a perforated support for a halved fruit, a supporting member movable toward and away from the fruit support, and a compressing member movable with the supporting member and comprising a spiral having its coils of successively decreasing diameter whereby to successively engage and exert pressure against the exterior of the halved fruit from the outer to the central portion thereof upon movement of the supporting member toward the fruit support and consequent compression of the said compressing member, the said spiral having its terminals anchored to the said supporting member.

3. In a device for expressing the juice from citrous fruits, a perforated support for a halved fruit, a supporting member movable toward and away from the fruit support, and a compressing member movable with the supporting member and comprising a spiral having its coils of successively decreasing diameter whereby to successively engage and exert pressure against the exterior of the halved fruit from the outer to the central portion thereof upon movement of the supporting member toward the fruit support and consequent compression of the said compressing member, the said spiral having its terminals anchored to the said supporting member, the coils being so relatively proportioned as to lie one within another in the final compressing position of the said compressing member and whereby to at such time substantially cover the entire exterior surface of the halved fruit.

4. In a device for expressing the juice from citrous fruits, a perforated support for a halved fruit, a supporting member movable toward and away from the fruit support, a compressing member movable with the supporting member and comprising a spiral having its coils of successively decreasing diameter whereby to successively engage and exert pressure against the exterior of the halved fruit from the outer to the central portion thereof upon movement of the supporting member toward the fruit support and consequent compression of the said compressing member, the said spiral having its terminals anchored to the said supporting member, the coils being so relatively proportioned as to lie one within another in the final compressing position of the said compressing member and whereby to at such time substantially cover the entire exterior surface of the halved fruit, and a disc upon the supporting member at the apex of the compressing member for exerting pressure upon the upper sides of the coils in the said final compression position of the member.

5. In a device for expressing the juice from citrous fruits, a perforated support for a halved fruit having a convex upper side, a supporting member movable toward and away from the fruit support, a compressing member movable with the supporting member and comprising a spiral coil having its major end presented toward the first mentioned support and adapted to have its turns successively brought into pressing engagement against the exterior of the halved fruit from the outer to the central portion thereof in the movement of the supporting member toward the said fruit support, and a concave disc at the apex of the said compressing member for exerting compressive force against the upper sides of the turns of the coil in the final compressing position of the said compressing member.

6. In a device for expressing the juice from citrous fruits, a base, a perforated support upon the base having a convex upper side and a circumferential shoulder, supporting means comprising a head movable toward and away from said perforated support, a plate suspended from the said head, means for moving the head, the plate having an opening the wall of which is of a diameter to embrace the circumferential shoulder of the perforated support, the said plate being movable with the head whereby to have its opening brought into position accommodating the said perforated support, and a compressing member comprising a spiral coil anchored at its base end to the said plate and at its apex to the said head whereby to have its coils successively brought into compressive engagement against the exterior of the halved fruit upon the perforated support from the outer to the central portion of said halved fruit in the movement of the head in the direction of the said perforated support.

7. In a device for expressing the juice from citrous fruits, a base, a perforated support upon the base having a convex upper side and a circumferential shoulder, supporting means comprising a head movable toward and away from said perforated support, a plate suspended from the said head, means for moving the head, the plate having an opening the wall of which is of a diameter to embrace the circumferential shoulder of the perforated support, the said plate being movable with the head whereby to have its opening brought into position accommodating the said perforated support, a compressing member comprising a spiral coil anchored at its base end to the said plate and at its apex to the said head whereby to have its coils successively brought into compressive engagement against the exterior of the halved fruit upon the perforated support from the outer to the central portion of said halved fruit in the movement of the head in the direction of the said perforated support, and a disc fixed with respect to the said head at the apex of the said compressing member for pressure engagement against the upper sides of the coils of the said member in the final compressing position of the head.

8. In a device for expressing the juice of citrous fruits, a perforated support for a halved fruit, a compressing member comprising a spiral coil having its base presented toward the said support, means for moving the said compressing member into and out of coactive relation with respect to the perforated support and for compressing the coils of the said member into successive engagement with the exterior of the halved fruit, and means at the base of the compressing member for slitting the edge of the fruit as the latter is flattened.

9. In a device for expressing the juice of citrous fruits, a perforated support for a halved fruit, supporting means comprising a head and a plate movable with relation thereto and having an opening to encompass the said perforated support, means for moving the head toward and from the said perforated support, a compressing member comprising a spiral coil anchored at its base end to the plate and at its apex to the head and adapted to have its coils compressed upon movement of the head in the direction of the perforated support whereby the coils will successively engage and exert pressure against the exterior of the halved fruit from the outer to the central portion thereof, the base coil of the compressing member extending about the said opening in the plate.

10. In a device for expressing the juice of citrous fruits, a perforated support for a halved fruit, supporting means comprising a head and a plate movable with relation thereto and having an opening to encompass the said perforated support, means for moving the head toward and from the said perforated support, a compressing member comprising a spiral coil anchored at its base end to the plate and at its apex to the head and adapted to have its coils compressed upon movement of the head in the direction of the perforated support whereby the coils will successively engage and exert pressure against the exterior of the halved fruit from the outer to the central portion thereof, the base coil of the compressing member extending about the said opening in the plate, and means located at intervals about the said opening for effecting radial slitting of the rind of the halved fruit as the fruit is compressed and flattened.

In testimony whereof I affix my signature.

JOHN S. LACEY. [L. S.]